United States Patent
Gorczowski (10) Patent No.: US 10,392,016 B2
(45) Date of Patent: Aug. 27, 2019

(54) SYSTEM AND METHOD FOR UPDATING A SPEED CALIBRATION OF A WORK VEHICLE

(71) Applicant: CNH Industrial America LLC, New Holland, PA (US)

(72) Inventor: Walter Phillip Gorczowski, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 158 days.

(21) Appl. No.: 15/695,314

(22) Filed: Sep. 5, 2017

(65) Prior Publication Data

US 2019/0071086 A1 Mar. 7, 2019

(51) Int. Cl.
*B60W 50/04* (2006.01)
*B60W 30/18* (2012.01)
(Continued)

(52) U.S. Cl.
CPC ............ *B60W 30/18* (2013.01); *B60W 50/04* (2013.01); *G05D 1/0223* (2013.01);
(Continued)

(58) Field of Classification Search
CPC ................. B60W 30/18; B60W 50/04; B60W 2050/0083; B60W 2300/15;
(Continued)

(56) References Cited

U.S. PATENT DOCUMENTS 4,168,611 A * 9/1979 Woyton .............. H02P 29/0022
198/502.4
4,803,626 A * 2/1989 Bachman ............ A01M 7/0089
118/323
(Continued)

FOREIGN PATENT DOCUMENTS

| DE | 10304126 | 8/2004 |
|---|---|---|
| WO | 2015092246 | 6/2015 |
| WO | 2015121260 | 8/2015 |

OTHER PUBLICATIONS

Chen et al., A DSRC-based collision warning and autonomous system for inter-vehicle communication, 2011, IEEE, p. 816-821 (Year: 2011).*
(Continued)

*Primary Examiner* — Mcdieunel Marc
(74) *Attorney, Agent, or Firm* — Rickard K. DeMille; Rebecca L. Henkel (57) ABSTRACT

A controller is configured to receive a first signal indicative of a spatial locating speed or a spatial locating position for determining the spatial locating speed. The controller is configured to determine a sensed speed of the work vehicle based on a calibration and a second signal indicative of a rotational rate of a wheel of the work vehicle, and to determine whether a difference between the sensed speed and the spatial locating speed exceeds a calibration threshold. In response to determining that the difference exceeds the calibration threshold, the controller is configured to update the calibration such that the sensed speed is substan-
(Continued)

tially equal to the spatial locating speed, and update the sensed speed based on the updated calibration and the second signal. Further, the controller is configured to instruct a speed control system to limit a ground speed of the work vehicle based on the sensed speed.

20 Claims, 4 Drawing Sheets (51) Int. Cl.
G05D 1/02 (2006.01)
B60W 50/00 (2006.01)
(52) U.S. Cl.
CPC ... *G05D 1/0278* (2013.01); *B60W 2050/0083* (2013.01); *B60W 2300/15* (2013.01); *B60W 2520/28* (2013.01); *B60W 2550/406* (2013.01); *B60W 2720/10* (2013.01); *G05D 2201/0201* (2013.01)
(58) Field of Classification Search
CPC ....... B60W 2520/28; B60W 2550/406; B60W 2720/10; G05D 1/0223; G05D 1/0278; G05D 2201/0201
See application file for complete search history.

(56) References Cited

U.S. PATENT DOCUMENTS

| | | | |
|---|---|---|---|
| 5,450,883 A * | 9/1995 | Payne | B67D 7/0496 |
| | | | 141/302 |
| 6,547,012 B2 | 4/2003 | Scarlett et al. | |
| 7,437,230 B2 | 10/2008 | McClure et al. | |
| 7,551,992 B2 | 6/2009 | Kitano | |
| 8,165,842 B2 | 4/2012 | Helck | |
| 8,301,327 B2 | 10/2012 | Nakao et al. | |
| 8,370,013 B2 | 2/2013 | Linda et al. | |
| 8,374,785 B2 | 2/2013 | McBurney et al. | |
| 8,493,200 B2 | 7/2013 | Wakao et al. | |
| 8,527,177 B2 | 9/2013 | Linda et al. | |
| 8,577,540 B2 | 11/2013 | Wada | |
| 8,985,252 B2 | 3/2015 | Otto et al. | |
| 9,078,391 B2 | 7/2015 | Pichlmaier | |
| 9,095,089 B2 | 8/2015 | Pichlmaier | |
| 9,170,913 B2 | 10/2015 | Hunt et al. | |
| 9,272,703 B2 | 3/2016 | Larsson et al. | |
| 2011/0295457 A1 | 12/2011 | Linda et al. | |
| 2014/0052337 A1* | 2/2014 | Lavoie | B62D 13/06 |
| | | | 701/41 |
| 2014/0163779 A1* | 6/2014 | Braunstein | G05D 1/021 |
| | | | 701/2 |
| 2016/0016470 A1 | 1/2016 | Pichlmaier | |
| 2016/0039480 A1 | 2/2016 | Pichlmaier | |
| 2016/0088787 A1 | 3/2016 | Connell et al. | |
| 2016/0313735 A1* | 10/2016 | Berkemeier | G05D 1/0212 |
| 2016/0313737 A1* | 10/2016 | Berkemeier | G05D 1/0212 |
| 2016/0333903 A1* | 11/2016 | Peterson | F15B 21/14 |
| 2017/0297621 A1* | 10/2017 | Bunderson | B62D 15/025 |
| 2017/0355398 A1* | 12/2017 | Dix | A01B 69/008 |

OTHER PUBLICATIONS

Skog et al., In-Car Positioning and Navigation Technologies—A Survey, 2009, IEEE, p. 4-21 (Year: 2009).*
Shaffer et al., Position estimator for underground mine equipment, 1992, IEEE, p. 1131-1140 (Year: 1992).*
Seegnnillet et al., Online calibration of vehicle powertrain and pose estimation parameters using integrated dynamics, 2012, IEEE, p. 3969-3974 (Year: 2012).*
Pexa, et al.; Measurements of Tractor Power Parameters using GPS; 2011, Res. Agr. Eng.; vol. 57, pp. 1-7.
Vishwanathan, Ramesh; Evaluation of Ground Speed Sensing Devices Under Varying Ground Surface Conditions; Jul. 2005, pp. 1-83.
Dyukov, Andriy; Test Vehicle Speed Error as a Function of Tire Pressure; Journal of Traffic and Transportation Engineering 4; 2016, pp. 102-106.

* cited by examiner

SYSTEM AND METHOD FOR UPDATING A SPEED CALIBRATION OF A WORK VEHICLE

BACKGROUND

The present disclosure relates generally to a system and method for updating a speed calibration of a work vehicle.

Certain work vehicles (e.g., tractors, harvesters, skid steers, etc.) are configured to be limited to certain top speeds. For example, work vehicles may include a speed control system that limits the top speed the work vehicle may achieve in accordance with certain regulations. In some embodiments, the speed control system limits the top speed of the work vehicle based on a sensed speed of the work vehicle that is determined based on a rolling circumference of a wheel of the work vehicle and a determination of a rotational rate of the wheel. Thus, the speed control system may limit a rotational rate of a drive component that drives the wheel. Unfortunately, the rolling circumference may not be accurate, therefore causing the vehicle to be limited to an incorrect top speed.

BRIEF DESCRIPTION

In one embodiment, a control system of a work vehicle includes a controller having a memory and a processor. The controller is configured to receive a first signal from a spatial locating device indicative of a spatial locating speed of the work vehicle or a spatial locating position of the work vehicle for determining the spatial locating speed. Additionally, the controller is configured to determine a sensed speed of the work vehicle based on a calibration and a second signal indicative of a rotational rate of a wheel of the work vehicle. The controller is also configured to determine whether a difference between the sensed speed and the spatial locating speed exceeds a calibration threshold. In response to determining that the difference exceeds the calibration threshold, the controller is configured to update the calibration such that the sensed speed is substantially equal to the spatial locating speed, and update the sensed speed based on the updated calibration and the second signal. Further, the controller is configured to instruct a speed control system to limit a ground speed of the work vehicle based on the sensed speed.

In one embodiment, a method for updating a calibration of a work vehicle includes receiving, via a controller, a first signal from a spatial locating device indicative of a spatial locating speed of the work vehicle or a spatial locating position of the work vehicle for determining the spatial locating speed. The method also includes determining, via the controller, a sensed speed of the work vehicle based on the calibration of the work vehicle and a second signal indicative of a rotational rate of a wheel of the work vehicle. Further, the method includes determining, via the controller, whether a difference between the sensed speed and the spatial locating speed exceeds a calibration threshold. In response to determining that at least the difference exceeds the calibration threshold, and zero to two of the following: the spatial locating speed and the sensed speed are substantially constant and above a speed threshold, and a draft load on the work vehicle is substantially constant and below a load threshold, the method further includes updating, via the controller, the calibration such that the sensed speed is substantially equal to the spatial locating speed, and updating the sensed speed based on the updated calibration and the second signal. Moreover, the method includes instructing, via the controller, a speed control system to limit a ground speed of the work vehicle based on the sensed speed.

In one embodiment, a control system of a work vehicle includes a spatial locating device configured to output a first signal indicative of a spatial locating speed of the work vehicle or a spatial locating position of the work vehicle for determining the spatial locating speed. The control system includes a rotation sensor configured to output a second signal indicative of a rotational rate of a wheel of the work vehicle and a load sensor configured to output a third signal indicative of a draft load on the work vehicle. Moreover, the control system includes a speed control system configured to control a ground speed of the work vehicle and a controller having a memory and a processor. The controller is communicatively coupled to the spatial locating device, the rotation sensor, the load sensor, and the speed control system. Additionally, the controller is configured to receive the first signal from the spatial locating device indicative of the spatial locating speed of the work vehicle or the spatial locating position of the work vehicle. The controller is also configured to receive the second signal from the rotation sensor indicative of the rotational rate of the wheel and receive the third signal from the load sensor indicative of the draft load. Further, the controller is configured to determine a sensed speed of the work vehicle based on a calibration and the second signal and determine whether a difference between the sensed speed and the spatial locating speed exceeds a calibration threshold. Additionally, in response to determining that the difference exceeds the calibration threshold, the spatial locating speed and the sensed speed are substantially constant and above a speed threshold, and the draft load on the work vehicle is substantially constant and below a load threshold, the controller is configured to update the calibration such that the sensed speed is substantially equal to the spatial locating speed, and update the sensed speed based on the updated calibration and the second signal. The controller is further configured to instruct the speed control system to limit the ground speed of the work vehicle based on the sensed speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments disclosed herein relate generally to a control system of a work vehicle. The control system includes a speed control system that limits a ground speed of the work vehicle based on a sensed speed (e.g., locally-determined speed, wheel-based speed, etc.). The control system determines the sensed speed based on a calibration (e.g., speed calibration) of the work vehicle and a signal (e.g., second signal) from a rotation sensor indicative of a rotation rate of a wheel of the work vehicle. In certain embodiments, the calibration is a rolling circumference of the wheels (e.g., wheels and tires, tires and hubs) of the work vehicle. Moreover, in certain embodiments, the control system receives a signal (e.g., first signal) indicative of a spatial locating speed (e.g., GPS speed) of the work vehicle from a spatial locating device (e.g., GPS sensor). In certain embodiments, the control system determines whether a difference between the sensed speed and the spatial locating speed exceeds a calibration threshold. Then, in response to determining that at least the difference exceeds the calibration threshold, in addition to a certain quantity (e.g., zero, one, two, three) of the following conditions: the spatial locating speed and the sensed speed are substantially constant and above a speed threshold, a draft load on the work vehicle is substantially constant and below a load threshold, and a steering angle is less than a steering angle threshold, the control system updates the calibration such that the sensed speed is substantially equal to the spatial locating speed, and updates the sensed speed based on the updated calibration and the second signal. Moreover, the control system may instruct a speed control system to limit the ground speed of the work vehicle based on the sensed speed.

Indeed, in certain embodiments, the calibration of the work vehicle may not be user adjustable to impede users from manipulating the speed control system to operate the work vehicle above a maximum sensed speed. For example, in certain embodiments, when a user wants to change the wheels of the work vehicle, or when the tires are worn to a different diameter, the rotational rate of a drive component that drives the wheels may not be changed. As a result, the speed control system may limit the ground speed of the work vehicle to maximum sensed speed that is lower or higher than a desired top speed. As such, a lack of a reliable process to update the rolling circumference of the wheels require users to have the rolling circumference updated by a distributor or to operate the work vehicle beneath the maximum sensed speed, thus reducing the efficiency of certain agricultural operations. As such, in certain embodiments, when a user changes the wheels and/or tires of the work vehicle, or when the tires are worn to a different diameter, the calibration is automatically updated via the presently disclosed techniques, thereby enabling the work vehicle to operate at sensed speeds ranging up to the maximum sensed speed.

Figure 1:
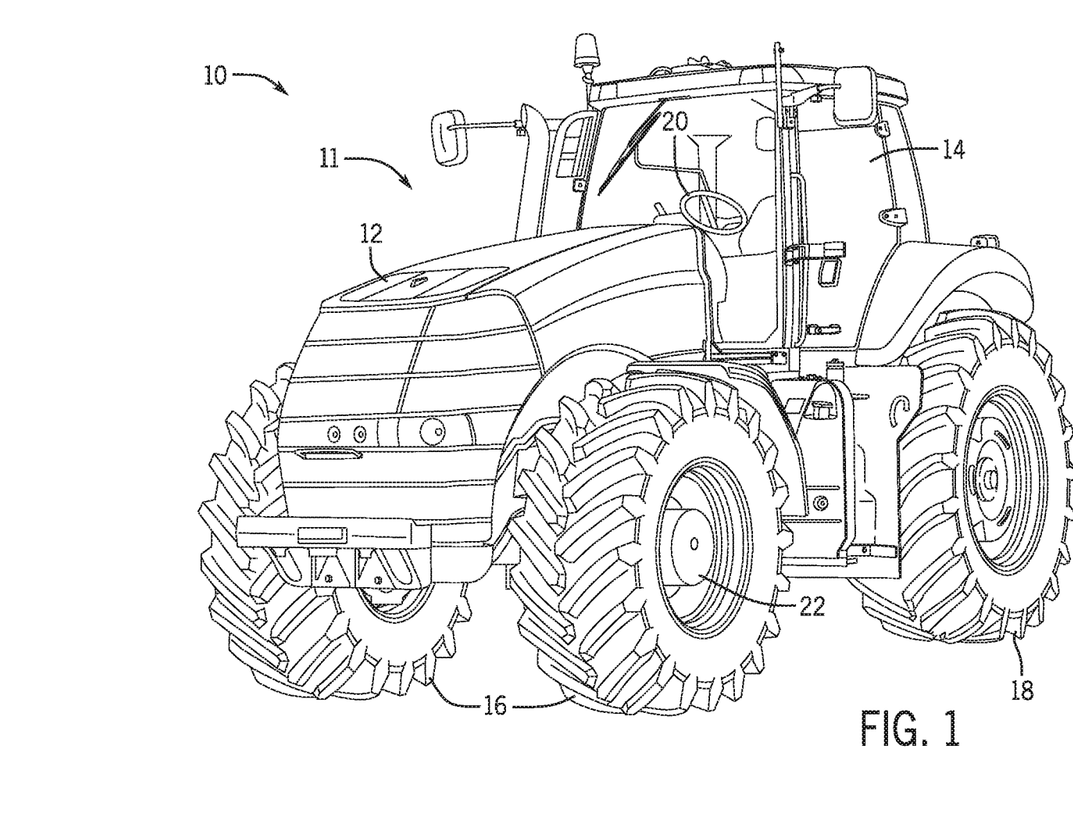
FIG. 1 is a perspective view of an embodiment of a work vehicle that includes a control system.

Turning now to the drawings, FIG. 1 is a perspective view of an embodiment of a work vehicle 10 that includes a control system 11. In the illustrated embodiment, the work vehicle 10 includes a frame 12 configured to house an engine, a transmission, other systems of the work vehicle 10, or a combination thereof. Additionally, the work vehicle 10 includes a cab 14 configured to house an operator. Moreover, the work vehicle 10 includes front wheels 16 and back wheels 18 configured to be driven by a drive system coupled to the engine and/or the transmission, thereby driving the work vehicle 10 along a field, a road, or any other suitable surface. The operator may steer the work vehicle 10 by manipulating or providing an input to a hand controller 20 within the cab 14. In the illustrated embodiment, the hand controller 20 is a steering wheel. However, the work vehicle 10 may be steered by any suitable controlling device, such as an electronic controlling device located within the work vehicle 10 or remote from the work vehicle 10. Furthermore, the work vehicle 10 may be configured to be remotely controlled and/or to operate autonomously. While the illustrated work vehicle 10 is a tractor, it should be appreciated that the control system 11 described herein may be employed within any other suitable work vehicle, such as a truck, an automobile, a harvester, a sprayer, or a skid steer. As discussed in detail below, the control system 11 of the work vehicle 10 controls certain components of the work vehicle 10.

In certain embodiments, the control system 11 includes a speed control system configured to limit a ground speed of the work vehicle 10 such that the sensed speed does not exceed a maximum sensed speed. In some embodiments, the maximum sensed speed is set in accordance with certain regulations (e.g., government-established speed limit for the work vehicle 10) and/or mechanical capabilities of the work vehicle 10. Moreover, in some embodiments, the maximum sensed speed is set to be within a threshold (e.g., within 1 kilometer per hour, within 2 kilometers per hour, within 3 kilometers per hour, etc.) from a government-established speed limit. The maximum sensed speed may be set by a distributor of the work vehicle 10, updated by the distributor when certain regulations change, or otherwise suitably modified by the distributor based on the components or environment of the work vehicle 10.

As discussed in more detail below, in certain embodiments, the control system 11 is configured to update a calibration used by the control system 11 to determine the sensed speed. The control system 11 may update the calibration such that the sensed speed of the work vehicle is substantially equal to a spatial locating speed determined based on a signal output by a spatial locating device. For example, in some embodiments, the spatial locating device outputs a speed signal indicative of the spatial locating speed of the work vehicle. In some embodiments, the spatial locating device outputs a position signal indicative of the position of the work vehicle, such that the control system 11 of the work vehicle determines the spatial locating speed therefrom. Thus, the speed control system may more accurately determine the sensed speed of the work vehicle so the ground speed is limited to a sensed speed ranging up to the maximum sensed speed instead of a sensed speed above or below the maximum sensed speed. Moreover, in certain embodiments, the calibration is updated when the tires on the wheels 16, 18 are changed to tires of a different outer diameter and/or when the tires are worn to a different outer diameter. As a result, the calibration is automatically updated to enable the work vehicle 10 to operate at sensed speeds ranging up to the maximum sensed speed.

Figure 2:
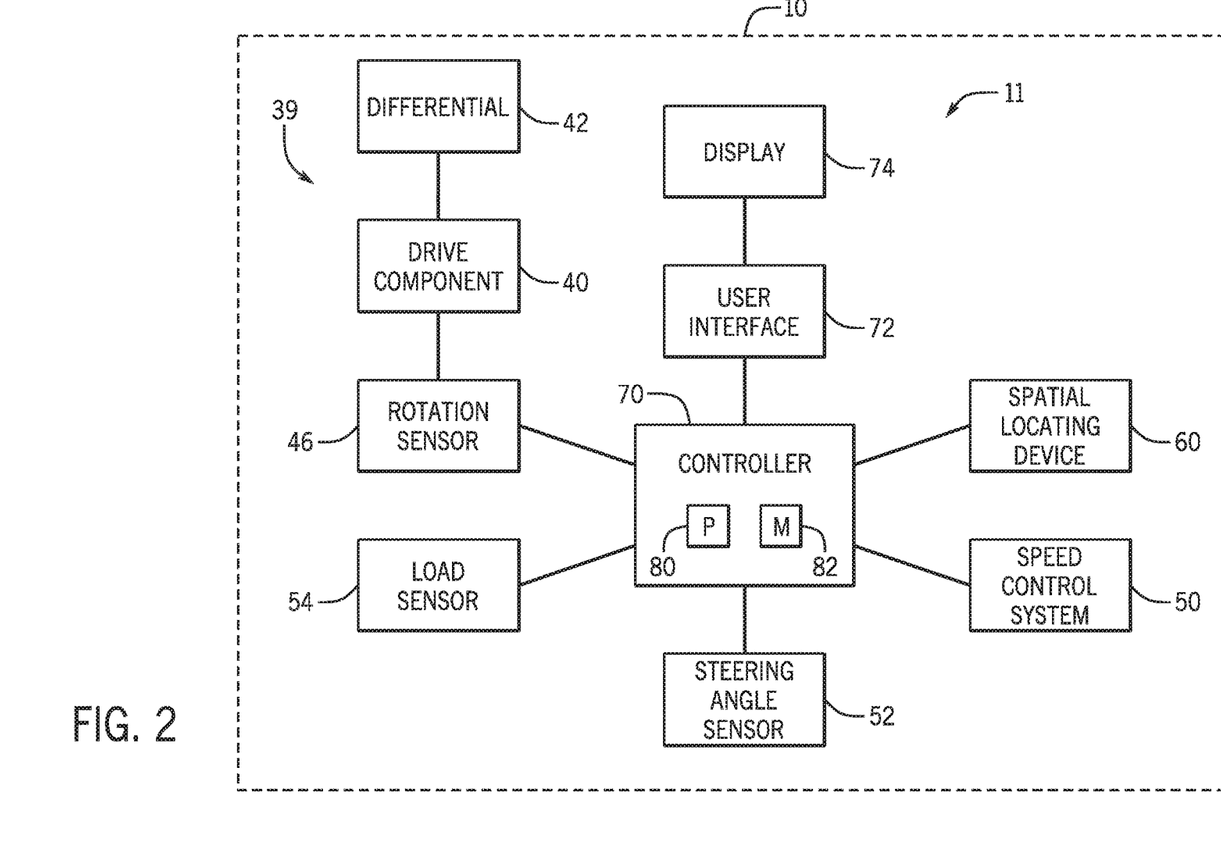
FIG. 2 is a schematic diagram of an embodiment of the control system of FIG. 1 that may be utilized to update a speed calibration.

FIG. 2 is a schematic diagram of an embodiment of the control system 11 of FIG. 1 that may be utilized to update the calibration. In the illustrated embodiment, the control system 11 is disposed within the work vehicle 10. The control system 11 is configured to update the calibration used to determine the sensed speed of the work vehicle 10. The ground speed is limited based on the sensed speed, so updating the calibration enables the work vehicle 10 to operate at ground speeds corresponding to sensed speeds that range up to the maximum sensed speed. The disclosed components and techniques may be combined in any suitable manner.

In the illustrated embodiment, the work vehicle 10 includes a drive system 39 having a drive component 40 (e.g., drive shaft) configured to drive the wheels of the work vehicle 10 to rotate. The drive component 40 is configured to deliver power from the engine and/or the transmission of the work vehicle 10 to the wheels. In certain embodiments, the drive component 40 is coupled to a differential 42 of the drive system 39. The differential 42 is configured to enable a pair of wheels to turn at different rates relative to one another (e.g., during a turn). For example, during turns of the work vehicle 10, the differential 42 enables an outer wheel of the pair of wheels to rotate faster than an inner wheel of the pair of wheels. During operation of the work vehicle 10, the differential 42 is configured to receive power from the drive component 40 and to apply a portion of the power to each wheel that is coupled to the differential 42. As a result, the wheels rotate to move the work vehicle 10. In certain embodiments, the differential 42 may be an open differential, a locking differential, a limited-slip differential, an electronically controlled differential, a torque-vectoring differential, or another suitable differential.

Moreover, the control system 11 of the work vehicle 10 includes a rotation sensor 46. In certain embodiments, the rotation sensor 46 is configured to output a signal indicative of a rotational rate of a wheel. The rotation sensor may be any suitable type of rotation sensor, such as an infrared sensor, an ultrasonic sensor, a magnetic sensor, an optical sensor, or another suitable sensor that is configured to output a signal indicative of the rotational rate of the wheel. In certain embodiments, the rotation sensor 46 is coupled near or adjacent to the drive component 40 to enable the rotation sensor 46 to directly monitor a rotation rate of the drive component 40. In such embodiments, the rotation sensor 46 outputs signals indicative of the rotation rate of the drive component. As such, the control system 11 may determine the rotation rate of the wheel based on a gear ratio between the wheel and the drive component 40. However, it is to be understood that in certain embodiments, rotation sensors may be additionally or alternatively disposed on or near the wheel or an axle of the wheel to output signals indicative of the rotation rate of the wheel directly.

In the illustrated embodiment, the control system 11 includes a speed control system 50 configured to control the ground speed of the work vehicle 10. In certain embodiments, the speed control system 50 limits and/or controls the ground speed of the work vehicle 10 such that the sensed speed does not exceed the maximum sensed speed of the work vehicle 10. That is, the work vehicle 10 may be configured operate at various ground speeds, corresponding to various sensed speeds ranging up to the maximum sensed speed.

Further, the control system 11 of the work vehicle 10 includes a steering angle sensor 52 configured to output a signal indicative of a steering angle (e.g., angle or rotation of the steering wheel relative to a straight position of the steering wheel, angle of the wheels relative to the longitudinal axis of the work vehicle 10, etc.). For example, the steering angle sensor 52 may be any suitable analog or digital sensor or sensor array for monitoring the steering angle of the work vehicle 10. Thus, the signal transmitted by the steering angle sensor 52 may facilitate determination of a steering angle of the wheels (e.g., front wheels) of the work vehicle 10 relative to the frame of the work vehicle.

Moreover, in certain embodiments, the control system 11 of the work vehicle 10 includes a load sensor 54 configured to output a signal indicative of a load carried by the work vehicle 10. In some embodiments, the load sensor 54 is configured to measure a draft load (e.g., load pulled by work vehicle 10). In certain embodiments, the draft load is caused by an implement, trailer, or another suitable device coupled to the work vehicle 10. As such, the load sensor 54 may be coupled near or at a connection between the work vehicle 10 and the device pulled behind the work vehicle 10.

In the illustrated embodiment, the control system 11 of the work vehicle 10 also includes a spatial locating device 60. In certain embodiments, the spatial locating device 60 is mounted to the work vehicle 10 and is configured to facilitate determination of a spatial locating position (e.g., GPS position) and/or a spatial locating speed (e.g., GPS speed) of the work vehicle 10. As will be appreciated, the spatial locating device 60 may include any suitable system configured to determine the spatial locating position and/or the spatial locating speed of the work vehicle 10, such as a global positioning system (GPS), for example. The spatial locating device 60 may output a signal indicative of a spatial locating speed of the work vehicle 10 or a spatial locating position of the work vehicle 10. In certain embodiments, by monitoring the spatial locating position of the work vehicle 10 over time, the spatial locating device 60 may be configured to determine a spatial locating speed of the work vehicle 10. In some embodiments, the signal from the spatial locating device 60 may enable other devices to determine the spatial locating speed of the work vehicle 10. While the present embodiments are further described with reference to the GPS speed and the GPS position of the work vehicle 10, it is to be understood that another suitable spatial locating speed and spatial locating position may be utilized in addition or as an alternative to the GPS speed and GPS position.

Furthermore, the control system 11 includes a controller 70 communicatively coupled to the rotation sensor 46, to the speed control system 50, to the steering angle sensor 52, to the load sensor 54, and to the spatial locating device 60. Based on signals transmitted to the controller 70 from the rotation sensor 46, the controller 70 may determine the sensed speed of the work vehicle 10. For example, the controller is configured to receive the signal from the rotation sensor 46 indicative of the rotation rate of the wheel. The signal from the rotation sensor includes pulses that are each indicative of a single rotation of the drive component 40. Then, the controller 70 determines a rotation rate of the drive component 40 over time, and further determines the rotation rate of the wheel based on the rotation rate of the drive component and a gear ratio.

Additionally, the controller 70 is configured to store the calibration that correlates the rotation rate of the wheel to the sensed speed of the work vehicle 10. The calibration may be a parameter that relates to a rolling circumference of the wheel being monitored or the wheel attached to the component being monitored. For example, in certain embodiments, the calibration is a rolling circumference of the wheel being monitored or the wheel attached to the component being monitored. That is, assuming no slip between the wheel and the ground beneath the wheel, the calibration may be defined as a longitudinal distance the wheel travels during one revolution of the wheel. In certain embodiments, the controller 70 stores and updates one calibration for the back wheels of the work vehicle (e.g., because the back wheels are near the drive component 40). Additionally, in certain embodiments (e.g., when four wheel drive is active), the controller 70 stores and updates an individual calibration for the front wheels and another individual calibration for the back wheels. In such embodiments, the two calibrations of the front wheels and the back wheels may be averaged together, the highest calibration of the two calibrations may be selected, the lowest calibration of the two calibrations may be selected, or another suitable selection may be made by the controller 70. Moreover, in some embodiments in which the front wheels and the back wheels have a similar rolling circumference or other suitable parameter, the controller 70 stores and updates one calibration (e.g., a collective calibration) for all four wheels.

In certain embodiments in which a sensor monitors the rotation rate of the drive component 40, the controller 70 is configured to determine the sensed speed of the work vehicle 10 based on the calibration, a gear ratio of the differential 42, and the rotation rate of the drive component 40. For example, in certain embodiments, the controller 70 is configured to multiply the calibration by both the gear ratio of the differential 42 and the rotation rate of the drive component 40 to determine the sensed speed. In such embodiments, the gear ratio may be dimensionless, the rotation rate may include units of inverse time, and the calibration may include units of distance. As such, the resulting sensed speed may include units of length divided by time (e.g., m/s, ft/s, mph, kph, etc.).

Although the sensed speed is described above as being determined relative to the rotation rate of the drive component 40, the present techniques may be employed to determine the sensed speed based on the rotation rate for another component. For example, in certain embodiments, the rotation sensor 46 directly measures a rotation rate of the wheel(s) of the work vehicles. As such, the sensed speed may be determined by multiplying the rotation rate of the wheel(s) by the calibration(s). Further, in certain embodiments, the rotation sensor 46 may measure a rotation rate of an axle directly coupled to the wheel, thus the sensed speed may be determined by multiplying the rotation rate of the axle by the calibration.

In certain embodiments, the controller 70 receives a signal from the spatial locating device 60 indicative of the GPS speed of the work vehicle or the GPS position of the work vehicle. Based on the signal from the spatial locating device, the controller 70 determines the GPS speed of the work vehicle 10. Additionally, in certain embodiments, the controller 70 is configured to determine a difference between the sensed speed and the GPS speed. For example, if the GPS speed is determined to be 38 kilometers per hour, and the sensed speed is determined to be 40 kilometers per hour, the difference between the sensed speed and the GPS speed is 2 kilometers per hour. In certain embodiments, the difference between the sensed speed and the GPS speed is an absolute difference. However, the difference between the sensed speed and the GPS speed may be determined with respect to positive and negative values in certain embodiments. In such embodiments, the difference between the sensed speed and the GPS speed may be considered to be +2 kilometers per hour.

In certain embodiments, the controller 70 is configured to compare the difference between the sensed speed and the GPS speed to a calibration threshold to determine whether the difference exceeds the calibration threshold. For example, the calibration threshold may be a percentage difference relative to the GPS speed. For example, the calibration threshold may be a 5 percent difference, a 10 percent difference, a 20 percent difference, or another suitable percent difference. If the calibration threshold is a 5 percent difference, the controller 70 determines that values of the difference between the sensed speed and the GPS speed exceed the calibration threshold if the difference exceeds 5 percent from the GPS speed. For example, in embodiments in which the calibration threshold is a 5 percent difference from the GPS speed, and the GPS speed is 40 kilometers per hour, the controller 70 determines that the difference exceeds the calibration threshold if the difference between the sensed speed and the GPS speed exceeds 2 kilometers per hour.

While described as a percent difference, the calibration threshold may be additionally or alternatively embodied as an absolute difference. For example, the calibration threshold may be a value (e.g., 2 kilometers per hour, 5 kilometers per hour, 10 kilometers per hour, etc.) relative to the GPS speed. Additionally, the units of kilometers per hour used herein are only intended to be exemplary, as other units such as miles per hour, meters per second, or another suitable unit of speed may be employed.

If the difference between the sensed speed and the GPS speed is within the calibration threshold, the controller 70 determines that the sensed speed and the GPS speed are in agreement. Thus, the controller 70 determines that the calibration utilized to determine the sensed speed of the work vehicle 10 is satisfactory and may not be updated.

In response to a determination that the difference between the sensed speed and the GPS speed is not within the calibration threshold, the controller 70 may proceed to update the calibration. As noted above, the sensed speed is determined based on the rotation rate of the wheel and the calibration. Thus, modifying the calibration may proportionally modify the sensed speed. In certain embodiments, in response to determining that the difference between the sensed speed and the GPS speed exceeds the calibration threshold, the controller 70 updates the calibration such that the sensed speed is substantially equal to the GPS speed. For example, the calibration may be updated by dividing the GPS speed by the rotation rate of the wheel to determine an updated calibration. Moreover, in some embodiments in which the rotation rate of the drive component 40 is monitored, the calibration may additionally or alternatively be updated by dividing the GPS speed by both the rotation rate of the drive component 40 and the gear ratio associated with the drive component to 40 determine the updated calibration. As used herein, substantially equal to refers to a difference between the sensed speed and the GPS speed being less than the calibration threshold.

By updating the calibration when the controller 70 determines that the difference between the sensed speed and the GPS speed exceeds the calibration threshold, and additionally updating the sensed speed based on the updated calibration and the rotation rate of the wheel, the controller 70 may determine more accurate sensed speeds for the work vehicle 10. In certain embodiments, the ground speed of the work vehicle 10 is limited based on the sensed speed. For example, the speed control system 50 may limit the ground speed to be at or below the maximum sensed speed by reducing the ground speed if the sensed speed exceeds the maximum sensed speed. Due to the updated calibration, the speed control system 50 receives more accurate sensed speeds to more accurately limit the ground speed of the work vehicle 10 as compared to work vehicles without automatically updated calibrations.

In certain embodiments, accuracy and/or efficiency of the calibration update process may be increased if the calibration process is only performed if one or more initial conditions are satisfied. For example, as noted above, the controller 70 may update the calibration in response to determining that the difference between the sensed speed and the GPS speed exceeds the calibration threshold. In certain embodiments, the calibration is updated such that the sensed speed substantially equals the GPS speed. In these embodiments, efficiency of the calibration update process is enhanced as compared to embodiments that constantly update the calibration.

Moreover, in some embodiments, the controller 70 only updates the calibration in response to determining that one or both of the GPS speed and the sensed speed are each substantially constant and one or both of the GPS speed and the sensed speed are above a speed threshold. Substantially constant means that the one or both of the GPS speed and the sensed speed are within a threshold range for a threshold amount of time. In some embodiments, the controller 70 may compare the GPS speed to a GPS speed threshold and compare the sensed speed to a sensed speed threshold. In further embodiments, the controller 70 may compare only the sensed speed to the sensed speed threshold, or may compare only the GPS speed to the GPS speed threshold. In certain embodiments, when one or both of the GPS speed and the sensed speed are substantially constant and one or both of the GPS speed and the sensed speed are above a respective speed threshold, the calibration is updated such that the sensed speed substantially equals the GPS speed. By only updating the calibration is response to determining that one or both of the GPS speed and the sensed speed are substantially constant and that one or both of the GPS speed and the sensed speed above a speed threshold, the controller 70 may increase an accuracy of the calibration, as compared to updating the calibration when the work vehicle 10 is changing sensed speed and/or GPS speed.

In certain embodiments, the controller 70 only updates the calibration in response to determining that the draft load on the work vehicle is below a load threshold and substantially constant. Substantially constant means that the draft load on the work vehicle is within a threshold range for a threshold amount of time. In certain embodiments, when the draft load on the work vehicle is below the load threshold and substantially constant, the calibration is updated such that the sensed speed substantially equals the GPS speed. The controller 70 may determine that the draft load on the work vehicle is below the load threshold and substantially constant based on the signal received from the load sensor 54. Moreover, in some embodiments, the controller 70 may determine an output (e.g., power output) of an engine of the work vehicle to monitor the draft load. In such embodiments, the controller 70 may therefore determine whether the draft load is below the load threshold and/or substantially constant (e.g., to ensure the work vehicle 10 does not slip). If the draft load is substantially constant, the controller 70 determines that the draft load on the work vehicle 10 is at a substantially steady state. Only updating the calibration when the draft load is low and constant increases the accuracy of the updated calibration because the wheels are less likely to slip on the ground as compared to when the draft load is high and changing. In some embodiments, the load threshold is stored within the controller 70 and may be updated based on certain factors (e.g., draft capacity, traction, etc.) of the work vehicle 10.

In some embodiments, the controller 70 only updates the calibration in response to determining that a signal strength of the signal output by the spatial locating device 60 is above a signal strength threshold. Further, in some embodiments, the controller 70 may determine whether the signal output by the spatial locating device 60 is valid (e.g., based on a number of satellites providing input to the spatial locating device 60), and update the calibration in response to determining the signal output by the spatial locating device 60 is valid. In some embodiments, the signal strength threshold is stored within the controller 70 and is updated based on certain factors (e.g., specifications of the spatial locating device 60, location of work vehicle 10, etc.). In certain embodiments, when the signal strength of the signal output by the spatial locating device 60 is above the signal strength threshold, the calibration is updated such that the sensed speed substantially equals the GPS speed. The controller 70 may determine that the signal strength is above the signal strength threshold based on the signal strength of spatial locating signals (e.g., GPS signals) received by the spatial locating device 60. Only updating the calibration when the spatial locating device 60 receives strong signals increases the accuracy of the calibration due to more accurate GPS speed measurements, as compared to using GPS speeds determined based on weak signals.

Moreover, in some embodiments, the controller 70 only updates the calibration in response to determining that the steering angle of the work vehicle 10 is below a steering angle threshold. The controller may determine that the steering angle is below the steering angle threshold if the steering angle is zero degrees, less than 2 degrees, less than 5 degrees, less than 10 degrees, or another suitable angle. In certain embodiments, the controller 70 may determine that the steering angle is below the steering angle threshold based on the signal received from the steering angle sensor 52. In some embodiments, the steering angle threshold is stored within the controller 70 and is updated based on certain factors (e.g., turn radius, vehicle type, etc.). In certain embodiments, when the steering angle of the work vehicle 10 is below the steering angle threshold, the calibration is updated such that the sensed speed substantially equals the GPS speed. Only updating the calibration when the steering angle is below the steering angle threshold produces more accurate sensed speed measurements as compared to measuring the sensed speed during turns, thus resulting in a more accurate calibration.

To display data indicative of the techniques disclosed herein (the position of the work vehicle 10, sensed speed of the work vehicle 10, and/or the GPS speed of the work vehicle, etc.), the controller 70 is configured to output a signal to a user interface 72 having a display 74. The user interface 72 is communicatively coupled to the controller 70. In some embodiments, the user interface 72 is on the work vehicle 10 or on a base station. The user interface 72 is configured to present data (e.g., sensed speed of the work vehicle 10, GPS speed of the work vehicle, data associated with operation of the work vehicle 10, etc.) to an operator. The user interface 72 may also be configured to enable the operator to control certain functions of the work vehicle 10. In addition, the user interface 72 (e.g., via the display 74, via an audio system, etc.) is configured to inform the operator that the controller 70 is updating the calibration. The display 74 may then present updated information to the operator.

Moreover, in certain embodiments, the user may provide input to the user interface 72 to request that the controller 70 update the calibration of the work vehicle 10. In response to the input from the user, the user interface 72 may transmit a signal to the controller 70 indicative of the input from the user. In certain embodiments, the user requests that the controller 70 update the calibration after the user has changed one or more wheels and/or tires of the work vehicle 10. Additionally, the user may request that the controller 70 update the calibration when the user visually identifies that the sensed speed is not substantially equal to the GPS speed. In some embodiments, the user provides the input to the user interface 72 by pressing a button, actuating a lever, providing a voice command, or providing another suitable instruction to the user interface 72 or another element of the control system 11. In certain embodiments, only when the input from the user is received, the controller 70 updates the calibration such that the sensed speed is substantially equal to the GPS speed. In some embodiments, the input from the user may override one or more of the conditions described above, such that the controller 70 updates the calibration each time the input from the user is received.

In certain embodiments, the controller 70 may update the calibration in response to determining that at least the difference between the sensed speed and the GPS speed exceeds the calibration threshold, as well as zero to four of the following: one or both of the GPS speed and the sensed speed are substantially constant and/or one or both of the GPS speed and the sensed speed are above respective speed thresholds, the draft load on the work vehicle is below the load threshold and substantially constant, the signal strength of the input provided by the spatial locating device 60 is above the signal strength threshold, and the steering angle of the work vehicle 10 is below the steering angle threshold. In some embodiments, the controller 70 is user customizable to enable the user to specify which of the above conditions are met before the controller 70 updates the calibration. In some embodiments, the controller 70 is manufacturer customizable to enable the manufacturer and/or distributor of the work vehicle 10 to select which of the above conditions are met before the controller 70 updates the calibration. Moreover, in certain embodiments, the controller 70 is further customizable to enable the manufacturer or the user or to select which of the above conditions are optionally met before the controller 70 updates the calibration.

By way of an example, in embodiments in which the controller 70 is manufacturer customizable (e.g., after providing certain log-in credentials), the controller 70 may be configured to update the calibration in response to determining that at least the difference between the sensed speed and the GPS speed exceeds the calibration threshold, as well as zero to two of the following: one or both of the GPS speed and the sensed speed are substantially constant and/or one or both of the GPS speed and the sensed speed are above the respective speed thresholds, and the draft load on the work vehicle is below the load threshold and substantially constant. Moreover, the manufacturer may configure the controller 70 such that the user of the work vehicle 10 may select whether the controller 70 only updates the calibration in response to determining that the steering angle of the work vehicle 10 is below the steering angle threshold.

In certain embodiments, the controller 70 is an electronic controller having electrical circuitry configured to process data from the rotation sensor 46, the steering angle sensor 52, the load sensor 54, the spatial locating device 60, or a combination thereof, among other components of the work vehicle 10. In the illustrated embodiment, the controller 70 includes a processor 80, such as a microprocessor, and a memory device 82. The controller 70 may also include one or more storage devices and/or other suitable components. The processor 80 may be used to execute software, such as software for controlling the speed control system 50, and so forth. Moreover, the processor 80 may include multiple microprocessors, one or more "general-purpose" microprocessors, one or more special-purpose microprocessors, and/or one or more application specific integrated circuits (ASICS), or some combination thereof. For example, the processor 80 may include one or more reduced instruction set (RISC) processors.

The memory device 82 may include a volatile memory, such as random access memory (RAM), and/or a nonvolatile memory, such as read-only memory (ROM). The memory device 82 may store a variety of information and may be used for various purposes. For example, the memory device 82 may store processor-executable instructions (e.g., firmware or software) for the processor 80 to execute, such as instructions for determining and/or receiving the GPS speed, determining the sensed speed, and updating the calibration. The storage device(s) (e.g., nonvolatile storage) may include ROM, flash memory, a hard drive, or any other suitable optical, magnetic, or solid-state storage medium, or a combination thereof. The storage device(s) may store data (e.g., threshold speeds, calibration thresholds, loads, etc.), instructions (e.g., for determining and/or receiving the GPS speed, for determining the sensed speed, and for updating the calibration, etc.), and any other suitable data.

Figure 3:
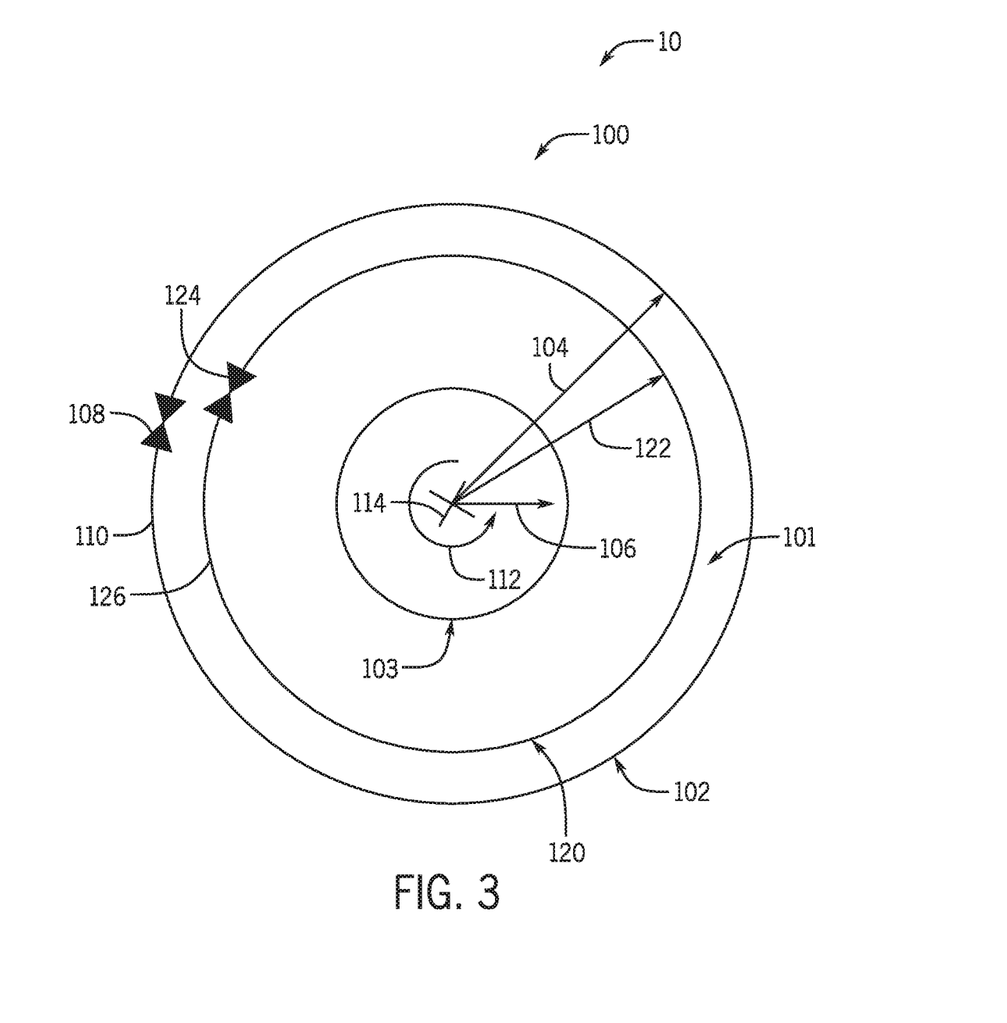
FIG. 3 is a schematic diagram of a cross-section of an embodiment of a wheel of the work vehicle of FIG. 1.

FIG. 3 is a schematic diagram of a cross-section of an embodiment of a wheel 100 that may be used on the work vehicle 10 of FIG. 1. The wheel 100 may be any suitable wheel of the work vehicle 10, such as a front wheel or a back wheel. Moreover, the wheel 100 may include a tire 101 disposed around a hub 103. The tire 101 may wear over time, thus reducing the circumference of the wheel 100 and affecting determination of the sensed speed of the work vehicle 10. In certain embodiments, the wheel 100 may alternatively or additionally be configured to be replaced by another wheel having a different circumference.

As shown, during an initial period of time (e.g. when the wheel 100 is new, partially used, etc.), the wheel 100 may have an initial cross-section 102. In certain embodiments, the initial cross-section 102 of the wheel 100 includes an initial radius 104 extending along a radial axis 106. The initial cross-section 102 of the wheel 100 also includes an initial circumference 108. In embodiments in which the initial cross-section 102 is a circle or substantially circular (e.g., ovular, oblong, etc.), the initial circumference 108 may be determined based on the initial radius 104. In certain embodiments, the initial circumference 108 extends around an outer edge 110 of the initial cross-section 102 along a circumferential axis 112. The circumferential axis 112 is perpendicular to a longitudinal axis 114 that extends through a plane of the page. In certain embodiments, the wheel 100 is configured to rotate about the longitudinal axis 114. In certain embodiments, the initial circumference 108 corresponds to the calibration of the wheel 100 (e.g., rolling circumference) during the initial period of time. Thus, the initial circumference 108 corresponds to the distance the wheel 100 travels during a single rotation about the longitudinal axis 114. Indeed, even for a tire of a wheel having a tire pressure below a target tire pressure, the corresponding calibration corresponds to the distance the wheel travels during a single rotation about the longitudinal axis.

During a subsequent period of time (e.g., after the initial period of time, when the wheel 100 is partially used, etc.), the wheel 100 may have a subsequent cross-section 120 (e.g., of the tire 101 disposed around the hub 103). Indeed, one or both of the tire 101 and the hub 103 may be changed to cause the wheel 100 to have the subsequent cross-section 120. The subsequent cross-section 120 of the wheel 100 has a subsequent radius 122 extending along the radial direction 106. In some embodiments, the subsequent radius 122 is smaller than the initial radius 104 of the initial cross-section 102 of the wheel 100. During the subsequent period of time, the wheel 100 may have a reduced radius such that the initial radius 104 is reduced to the subsequent radius 122. The reduction in radius may be caused by wear of the tire 101 (e.g., wear that reduces a quantity of tread on the tire 101). However, in other embodiments, the reduction in size from the initial radius 104 to the subsequent radius 122 may result from the user changing the tire 101 and/or the hub 103 (e.g., to perform a different task). For example, various wheels may be configured to operate differently in different environments. For example, larger wheels may be desired when the work vehicle 10 is configured to travel distances, smaller wheels may be desired when the work vehicle 10 is configured to pull heavy loads, and deeper treads on the tire 101 may be desired for muddy conditions. The controller determines a new calibration when the wheel is changed, thus producing a more accurate sensed speed.

The subsequent cross-section 120 of the wheel 100 includes a subsequent circumference 124. The subsequent circumference 124 extends around an outer edge 126 of the subsequent cross-section 120 along the circumferential axis 112. As a result of the smaller subsequent radius 122, the subsequent circumference 124 of the subsequent cross-section 120 is also smaller than the initial circumference 108 of the initial cross-section 102. Thus, for each rotation of the wheel 100 about the longitudinal axis 114, the wheel 100 travels a smaller distance during the subsequent period of time, as compared to during the initial period of time.

In certain embodiments, the calibration described above with reference to FIG. 2 corresponds to the circumference 108, 124 of the wheel 100 during a respective period of time. That is, the calibration is the rolling circumference of the wheel 100. As such, when the wheel 100 wears and changes circumference over time, the controller may update the calibration to correspond with the newly determined rolling circumference. The controller is configured to update the calibration when one or more conditions are met. For example, the controller may update the calibration in response to determining that at least the difference between the sensed speed and the GPS speed of the work vehicle 10 exceeds the calibration threshold, as well as zero to four of the following: one or both of the GPS speed and the sensed speed are substantially constant and/or one or both of the GPS speed and the sensed speed are above respective speed thresholds, the draft load on the work vehicle is below the load threshold and substantially constant, the signal strength of the input provided by the spatial locating device 60 is above the signal strength threshold, and the steering angle of the work vehicle 10 is below the steering angle threshold. In certain embodiments, the GPS speed and the sensed speed are substantially equal when the calibration is updated to correspond to the current circumference of the wheel 100.

In certain embodiments, the difference between the sensed speed and the GPS speed may exceed the calibration threshold because the circumference of the wheel 100 has changed (e.g., due to wear or because the wheel 100 has been replaced with a wheel of a different radius). Thus, because the sensed speed is determined based on the calibration and the rotation rate of the wheel, the calibration is updated to enhance accuracy of sensed speed determination. Additionally, the sensed speed is updated based on the updated calibration and the rotation rate of the wheel. The speed control system may limit the ground speed of the work vehicle 10 based on a more accurate sensed speed.

Moreover, although described with reference to monitoring the rotation rate of the wheel 100, the rotation rate of other components may be used to determine the sensed speed. For example, if the rotation sensor outputs a signal indicative of the rotation rate of the drive component, the sensed speed may be determined based on the rotation rate of the drive component and the corresponding gear ratio.

Figure 4:
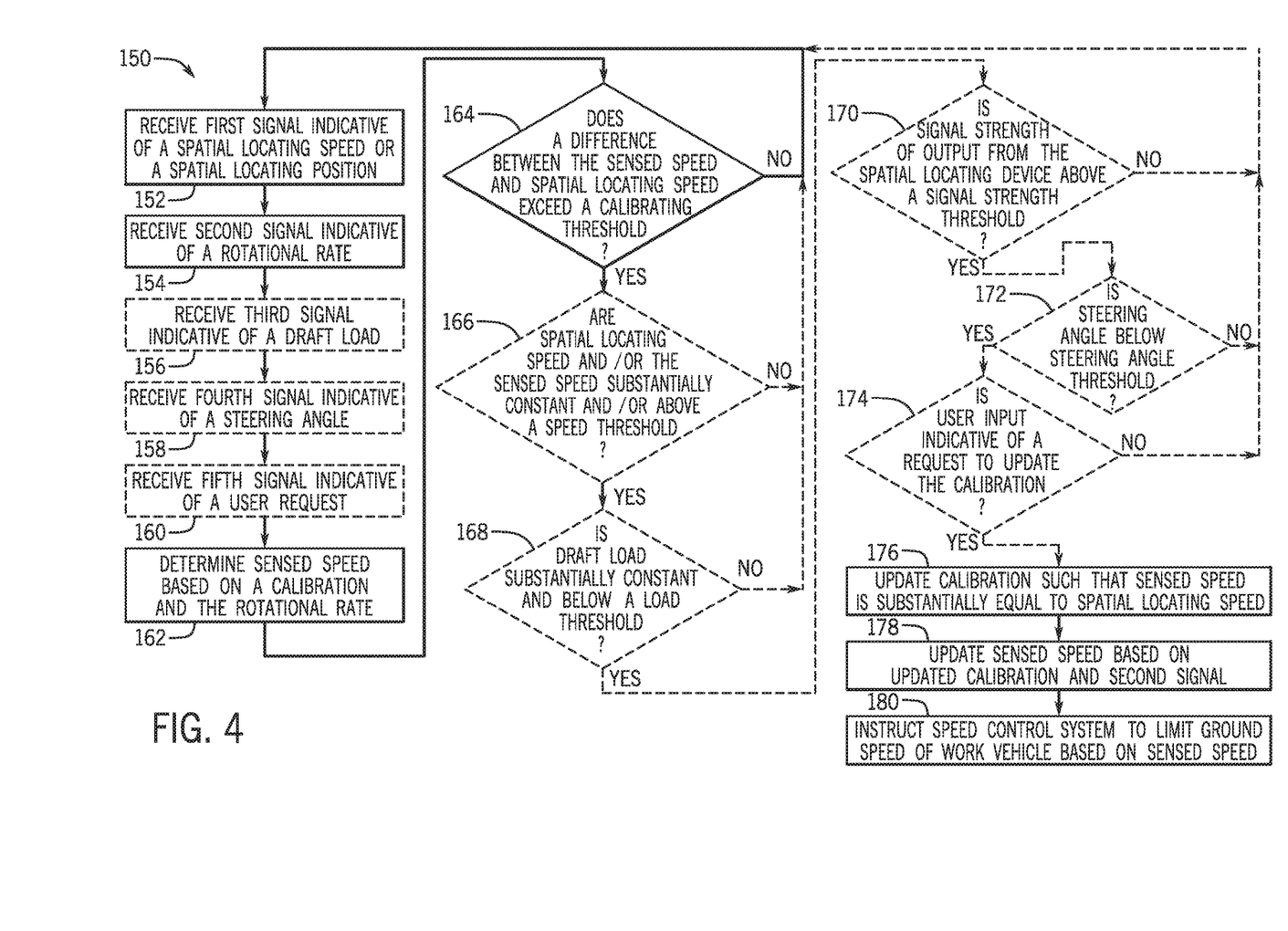
FIG. 4 is a flow diagram of an embodiment of a method for updating a speed calibration of the work vehicle of FIG. 1.

FIG. 4 is a flow diagram of an embodiment of a method 150 for updating the calibration of the work vehicle of FIG. 1. While the present discussion is presented as being performed by the controller of the work vehicle, another suitable component, such as a remotely located controller, may perform the techniques discussed herein. First, as represented by block 152, a first signal indicative of a spatial locating speed or a spatial locating position of the work vehicle is received (e.g., from the spatial locating device 60). Additionally or alternatively, the first signal may be indicative of a position (e.g., GPS coordinates) of the work vehicle 10, and the controller may determine the spatial locating speed based on positions of the work vehicle 10 over time.

Next, as represented by block 154, a second signal indicative of a rotational rate is received (e.g., from the rotation sensor 46). In certain embodiments, the rotational rate is a rotational rate of a wheel. Further, in some embodiments, the rotational rate is a rotational rate of a drive component 40 configured to drive the wheel.

In certain embodiments, the controller may receive additional conditions of initiating the calibration process. As such, one or more of the following signals may be optionally received and/or optionally used by the controller. For example, as represented by block 156, a third signal indicative of a draft load on the work vehicle is received (e.g., from the load sensor 54). Further, as represented by block 158, a fourth signal indicative of a steering angle of the work vehicle is received (e.g., from the steering angle sensor 52). In addition, as represented by block 160, a fifth signal indicative of a user request to update the calibration is received (e.g., from the user interface 72). In certain embodiments, all of the signals are received and used by the controller according to the method 150. However, in some embodiments, only a portion of the signals are received and used by the controller according to the method 150. It is to be understood that the quantity of signals and the uses thereof are not intended to limit the present disclosure, and instead are described to present certain options by which manufacturers and/or users of the work vehicle may customize how controller updates the calibration to enable more accurate determinations of sensed speeds.

Next, as represented by block 162, a sensed speed is determined based on a calibration and the rotational rate of the wheel. In certain embodiments, the sensed speed is determined based on the calibration and the rotation rate of the wheel. However, it is to be understood that the sensed speed of the work vehicle 10 may be determined based on any suitable components of the work vehicle 10.

Based on the received inputs, the controller may determine whether one or more update conditions are met. For example, as represented by block 164, whether a difference between the sensed speed and the spatial locating speed is outside a calibration threshold is determined. Additionally, as represented by block 166, whether the spatial locating speed and the sensed speed are substantially constant and above a speed threshold is determined. Further, as represented by block 168, whether the draft load on the work vehicle 10 is constant and below a load threshold is determined. Moreover, as represented by block 170, whether a signal strength of the input provided by the spatial locating device is above the signal strength threshold is determined. Further, as represented by block 172, whether the steering angle of the work vehicle 10 is below the steering angle threshold is determined. Additionally, as represented by block 174, whether the user input is indicative of a request to update the calibration is determined.

Next, as represented by block 176, in response to determining that at least the difference between the sensed speed and the GPS speed exceeds the calibration threshold, as well as zero to four of the following: one or both of the GPS speed and the sensed speed are substantially constant and/or one or both of the GPS speed and the sensed speed are above respective speed thresholds, the draft load on the work vehicle is below the load threshold and substantially constant, the signal strength of the input provided by the spatial locating device 60 is above the signal strength threshold, and the steering angle of the work vehicle 10 is below the steering angle threshold, the calibration is updated such that the sensed speed is substantially equal to the spatial locating speed. For example, the calibration may be updated in response to determining that the difference is outside the calibration threshold, in response to determining that the spatial locating speed and the sensed speed are substantially constant and above a speed threshold, in response to determining that a draft load on the work vehicle is substantially constant and below a load threshold, in response to determining that the signal strength of the input provided by the spatial locating device is above the signal strength threshold, in response to determining that the user input is indicative of a request to update the calibration, or a combination thereof. In certain embodiments, the controller may be configured to update the calibration when one or more of the update conditions, such as 1, 2, 3, 4, 5, or more update conditions, are met. In certain embodiments, if the selected update condition(s) are not met, the controller may cycle back to continue receiving signals until the update condition(s) are met.

Additionally, as represented by block 178, in response to determining that at least the difference between the sensed speed and the GPS speed exceeds the calibration threshold, as well as zero to four of the following: one or both of the GPS speed and the sensed speed are substantially constant and/or one or both of the GPS speed and the sensed speed are above respective speed thresholds, the draft load on the work vehicle is below the load threshold and substantially constant, the signal strength of the input provided by the spatial locating device is above the signal strength threshold, and the steering angle of the work vehicle 10 is below the steering angle threshold, the sensed speed is updated based on the updated calibration and the rotation rate of the wheel. For example, the updated sensed speed may be determined by multiplying the updated calibration by the rotational rate of the wheel.

Further, as represented by block 180, a speed control system is instructed to limit the ground speed of the work vehicle based on the sensed speed. For example, the speed control system may limit the ground speed to be at or below the maximum sensed speed by reducing the ground speed if the sensed speed exceeds the maximum sensed speed. Accordingly, via the method 150 the controller of the control system may determine and update the calibration used to determine the sensed speed more efficiently and/or accurately than embodiments without the components for automatically updating the calibration of the work vehicle.

Thus, the embodiments disclosed herein enable the control system to update (e.g., automatically update) the calibration used to determine the sensed speed of the work vehicle more efficiently and/or accurately to facilitate accurate control of the ground speed of the work vehicle (e.g., limiting the ground speed based on the maximum sensed speed). In such embodiments, when a user changes the wheels of the work vehicle, or when the wheels are worn to a different radius, the calibration is updated such that the sensed speed of the work vehicle may be accurately determined.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A control system of a work vehicle, comprising:
   a controller having a memory and a processor, wherein the controller is configured to:
   receive a first signal from a spatial locating device indicative of a spatial locating speed of the work vehicle or a spatial locating position of the work vehicle for determining the spatial locating speed;
   determine a sensed speed of the work vehicle based on a calibration and a second signal indicative of a rotational rate of a wheel of the work vehicle;
   determine whether a difference between the sensed speed and the spatial locating speed exceeds a calibration threshold;
   in response to determining that the difference exceeds the calibration threshold, update the calibration such that the sensed speed is substantially equal to the spatial locating speed, and update the sensed speed based on the updated calibration and the second signal; and
   instruct a speed control system to limit a ground speed of the work vehicle based on the sensed speed.

2. The control system of claim 1, wherein the calibration comprises a rolling circumference of the wheel of the work vehicle.

3. The control system of claim 1, wherein the controller is configured to determine the sensed speed by multiplying the calibration by the rotational rate of the wheel.

4. The control system of claim 1, wherein the controller is configured to update the calibration by dividing the spatial locating speed by the rotation rate of the wheel.

5. The control system of claim 1, wherein the speed control system is configured to limit the ground speed of the work vehicle by instructing the speed control system to reduce the sensed speed in response to determining that the sensed speed is greater than a maximum sensed speed.

6. The control system of claim 1, wherein the controller is configured to determine whether one or both of the spatial locating speed and the sensed speed are substantially constant and whether one or both of the spatial locating speed and the sensed speed are above a speed threshold, and the calibration and the sensed speed are only updated in response to determining that one or both of the spatial locating speed and the sensed speed are substantially constant and whether one or both of the spatial locating speed and the sensed speed are above the speed threshold.

7. The control system of claim 1, wherein the controller is configured to determine whether a draft load on the work vehicle is substantially constant and below a load threshold, and the calibration and the sensed speed are only updated in response to determining that the draft load on the work vehicle is substantially constant and below the load threshold.

8. The control system of claim 1, wherein the controller is configured to determine whether a signal strength of the first signal from the spatial locating device is above a signal strength threshold, and the calibration and the sensed speed are only updated in response to determining that the signal strength is above the signal strength threshold.

9. The control system of claim 1, wherein the controller is configured to determine whether a steering angle of the work vehicle is below a steering angle threshold, and the calibration and the sensed speed are only updated in response to determining that the steering angle is below the steering angle threshold.

10. The control system of claim 1, wherein the controller is configured to receive a third signal from a user interface indicative of a request to update the calibration, and the calibration and the sensed speed are only updated in response to receiving the third signal from the user interface.

11. The control system of claim 1, wherein the calibration threshold is stored in the memory of the controller, and the calibration threshold comprises a percentage difference between the sensed speed and the spatial locating speed.

12. The control system of claim 1, wherein the controller is configured to output a fourth signal indicative of the calibration, the sensed speed, the spatial locating speed, or a combination thereof, to a display of the work vehicle.

13. A method for updating a calibration of a work vehicle, comprising:
receiving, via a controller, a first signal from a spatial locating device indicative of a spatial locating speed of the work vehicle or a spatial locating position of the work vehicle for determining the spatial locating speed;
determining, via the controller, a sensed speed of the work vehicle based on the calibration of the work vehicle and a second signal indicative of a rotational rate of a wheel of the work vehicle;
determining, via the controller, whether a difference between the sensed speed and the spatial locating speed exceeds a calibration threshold;
in response to determining that at least the difference exceeds the calibration threshold, and zero to two of the following: the spatial locating speed and the sensed speed are substantially constant and above a speed threshold, and a draft load on the work vehicle is substantially constant and below a load threshold, updating, via the controller, the calibration such that the sensed speed is substantially equal to the spatial locating speed, and updating the sensed speed based on the updated calibration and the second signal; and
instructing, via the controller, a speed control system to limit a ground speed of the work vehicle based on the sensed speed.

14. The method of claim 13, wherein updating the calibration such that the sensed speed is substantially equal to the spatial locating speed comprises dividing, via the controller, the spatial locating speed by the rotational rate of the wheel.

15. The method of claim 13, comprising receiving, via the controller, a third signal from a user interface indicative of a request to update the calibration, and the calibration and the sensed speed are only updated in response to receiving the third signal from the user interface.

16. The method of claim 13, comprising outputting, via the controller, a fourth signal to a display of the work vehicle indicative of the calibration, the sensed speed, the spatial locating speed, or a combination thereof.

17. A control system of a work vehicle, comprising:
a spatial locating device configured to output a first signal indicative of a spatial locating speed of the work vehicle or a spatial locating position of the work vehicle for determining the spatial locating speed;
a rotation sensor configured to output a second signal indicative of a rotational rate of a wheel of the work vehicle;
a load sensor configured to output a third signal indicative of a draft load on the work vehicle;
a speed control system configured to control a ground speed of the work vehicle; and
a controller having a memory and a processor, wherein the controller is communicatively coupled to the spatial locating device, the rotation sensor, the load sensor, and the speed control system, and wherein the controller is configured to:
receive the first signal from the spatial locating device indicative of the spatial locating speed of the work vehicle or the spatial locating position of the work vehicle;
receive the second signal from the rotation sensor indicative of the rotational rate of the wheel;
receive the third signal from the load sensor indicative of the draft load;
determine a sensed speed of the work vehicle based on a calibration and the second signal;
determine whether a difference between the sensed speed and the spatial locating speed exceeds a calibration threshold;
in response to determining that the difference exceeds the calibration threshold, the spatial locating speed and the sensed speed are substantially constant and above a speed threshold, and the draft load on the work vehicle is substantially constant and below a load threshold, update the calibration such that the sensed speed is substantially equal to the spatial locating speed, and update the sensed speed based on the updated calibration and the second signal; and
instruct the speed control system to limit the ground speed of the work vehicle based on the sensed speed.

18. The control system of claim 17, comprising a steering angle sensor, wherein the controller is configured to receive a fourth signal from the steering angle sensor indicative of a steering angle of the work vehicle, and determine whether the steering angle is below a steering angle threshold, and the calibration and the sensed speed are only updated in response to determining that the steering angle is below the steering angle threshold.

19. The control system of claim 17, wherein the controller is configured to determine whether a signal strength of the first signal from the spatial locating device is above a signal strength threshold, and the calibration and the sensed speed are only updated in response to determining that the signal strength of the first signal is above the signal strength threshold.

20. The control system of claim 17, wherein the calibration comprises a rolling circumference of the wheel of the work vehicle.

* * * * *